Figure 2:
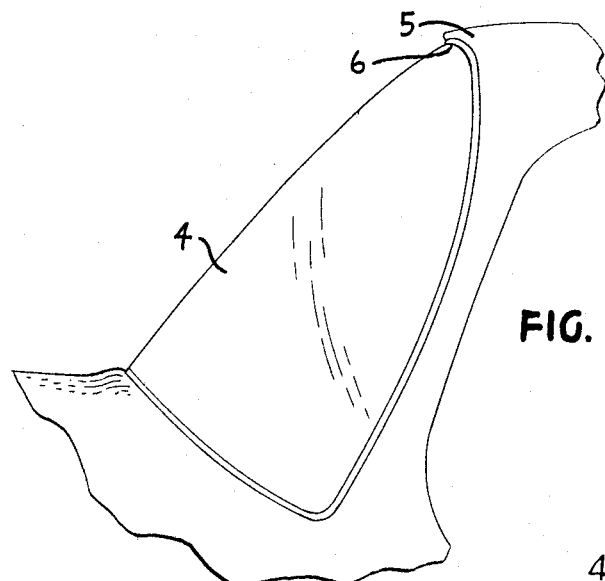

Nov. 29, 1966     T. P. MARTIN     3,288,667
SEALING ELEMENT
Filed April 29, 1964

INVENTOR.
THOMAS P. MARTIN
BY Oscar L. Spencer
ATTORNEY 3,288,667
       SEALING ELEMENT
Thomas P. Martin, West Caldwell, N.J., assignor to Pittsburgh Plate Glass Company, Pittsburgh, Pa., a corporation of Pennsylvania
     Filed Apr. 29, 1964, Ser. No. 363,513
         7 Claims. (Cl. 161—44)

This invention relates to sealing elements suitable for use in sealing various structures, such as automotive windshields, and more particularly, to such sealing elements containing a resilient core within a preformed, shaped body of an adhesive material of certain composition and particularly advantageous properties.

In sealing solid surfaces to each other, as exemplified by the application of automotive windshields and like structures, it has been conventional to utilize a channel member made of rubber. For example, an automobile windshield is ordinarily applied by fitting the glass into a channel along with a sealing compound. Such methods have been relatively satisfactory, but suffer from inherent disadvantages in fabrication and use.

The sealing elements of this invention permit the sealing of solid surfaces, including the application of glass to metal bodies, without the necessity for channels, gaskets or the like. For example, these sealing elements, in the form of an elongated, preformed tape, are used to seal the periphery of a glass windshield, back-light, or quarter-panel to a metal flange, forming a permanently resilient, moisture and vapor impervious seal. The sealing elements herein can also be employed to seal glass to metal, glass, wood, plastics, or other solid surface in any glazing operation, and in sealing the above materials to each other as well.

The sealing elements of this invention comprise an adhesive material of certain composition containing an integral core of a resilient, flexible polymeric material. Illustrating these sealing elements and their use is the drawing herein, in which FIGURE 1 is an isometric view of a roll of the sealing element of the invention, and FIGURE 2 shows an automotive windshield sealed to a metal body.

Figure 1:
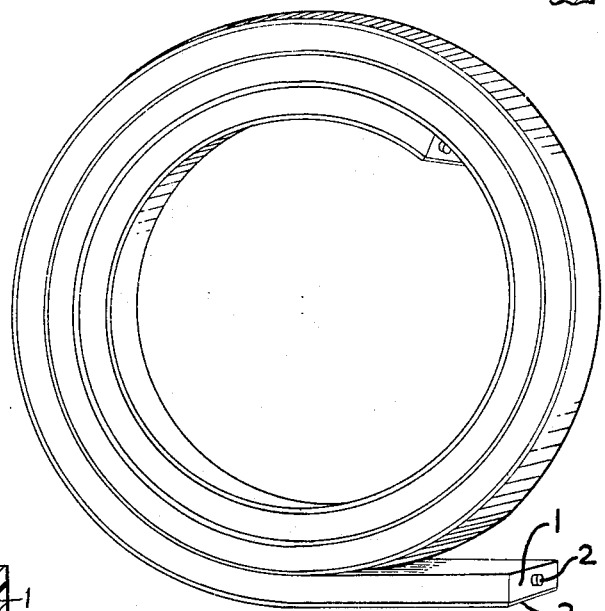

The sealing element of FIGURE 1 is composed of a preformed, shaped body of an adhesive composition 1 containing a core 2 rolled onto a paper backing strip 3.

The windshield structure of FIGURE 2 comprises a glass windshield 4 which is attached to a metal body 5 by means of the sealing element 6.

Figure 3:
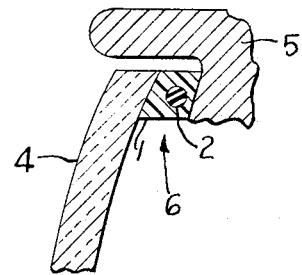

FIGURE 3 is a cross-sectional view of the windshield structure of FIGURE 2. The sealing element 6 comprises an adhesive composition 1 and an integral core 2.

Figure 4:
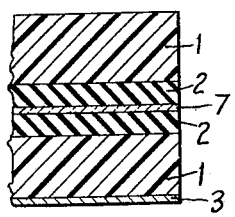

FIGURE 4 is a cross-sectional view of a sealing element of the invention containing a continuous nonextensible thread 7 within the core 2.

The adhesive composition of the sealing elements herein comprises a blend of a polymer of a 4 carbon monoolefin and a copolymer of a 4 carbon monoolefin and a diolefin having 4 to 6 carbon atoms.

The polymer of a 4 carbon monoolefin includes polymers of isobutylene, butene-1 and butene-2, as well as mixed polymers of these compounds, such as polymerized unsaturated 4 carbon atom fractions obtained from the distillation of petroleum. In order to attain the necessary properties, the polymer should have a molecular weight between about 300 and about 15,000.

The copolymers employed herein are those often termed "butyl rubbers" and include rubber-like polymeric substances produced by the copolymerization of a monoolefin, such as isobutylene, and a diolefin, such as butadiene, isoprene, dimethylbutadiene, pentadiene and piperyline. These copolymers contain from about 70 percent to about 99.5 percent by weight of the monoolefin and from about 30 percent to about 0.5 percent by weight of the diolefin, and have a molecular weight between about 25,000 and about 100,000. The copolymer can also contain chlorine along with the unsaturated linkages from the diolefin. Such chlorinated butyl rubbers are of particular value for many applications.

These copolymers include materials which differ in the amount of diolefin contained therein and the rate at which they may be cured, such as those known as Enjay Butyl 035, which contains 0.8 mole percent isoprene units; Enjay Butyl 150, which contains 1.3 mole percent isoprene; and Enjay Butyl 215, which contains 1.8 mole percent isoprene; as well as those which differ in molecular weight, such as Enjay Butyl 217 and Enjay Butyl 218, which have Staudinger molecular weights of about 50,000 and about 60,000, respectively (Staudinger molecular weights, as reported herein, are determined by Staudinger's equation in which the molecular weight is a function of intrinsic viscosity). A preferred copolymer, Enjay Butyl 150, is a copolymer of isobutylene and about 1.3 percent isoprene, and has a Staudinger molecular weight of about 40,000. Chlorine-containing copolymers include the Enjay Butyl HT Series, one preferred member of which is Enjay Butyl HT-1066, a chlorinated copolymer of isobutylene and about 1.5 mole percent isoprene, having a Staudinger molecular weight of about 40,000.

The proportion of polymer and copolymer in the adhesive composition depends upon the physical characteristics desired and the molecular weight of the polymer employed. Generally, it has been found that the higher the molecular weight of the polymer of a 4 carbon monoolefin, the more of it that is required to obtain the desired properties in the adhesive composition. For example, using a polymer of a 4 carbon monoolefin having a molecular weight of about 8,000 to about 15,000, in combination with a butyl rubber copolymer having a Staudinger molecular weight of about 30,000 to about 60,000, it is preferred to employ about 100 to about 210 parts by weight of the polymer based on 100 parts of the copolymer. When a similar copolymer is employed with a polymer, such as a polymerized petroleum fraction comprising mixed butenes, and having a molecular weight of 300 to 5,000, it is preferred to combine about 45 to 65 parts by weight of the polymer with 100 parts of the butyl rubber copolymer.

In order to achieve the desired properties in the adhesive composition, it is essential to at least partially vulcanize the mixture. Vulcanization provides, among other properties, a degree of resiliency of the adhesive which enables the sealing element to recover its desired shape upon extension, and restrains flow or displacement under conditions in which low loads are applied for long times, as in use or storage. This is particularly necessary in sealing operations in which the handling of the sealant or movement of the sealed structures could otherwise result in its deformation.

Various vulcanizing systems can be employed, using such materials as paradinitrosobenzene, sulfur, dibutylthiocarbamate (Butyl Zimate), 2-mercaptobenzothiazole, paraquinone dioxime, para-paradibenzoyl quinone dioxime, lead oxide, benzothiazyl disulfide, tetramethylthiuram disulfide, and various resinous vulcanizing agents, such as para-substituted phenolic resins, for example, the heat-reactive, bromomethyl-substituted phenol-formaldehyde resin known as Schenectady SP–1055. With chlorine-containing butyl rubbers, the above vulcanizing agents can also be utilized, as can such materials as zinc oxide, diethylene triamine, magnesium oxide, and resins such as the heat-reactive polymethylol-substituted phenol-formaldehyde resin known as Amberol ST–137.

A preferred vulcanizing agent is paradinitrosobenzene, which is the reaction product of paraquinone dioxime and an oxidizing agent. These components may be added separately and reacted in situ, or they may be prereacted. It is convenient to employ paradinitrosobenzene as a mixture with 75 percent by weight of inert wax or clay, such a mixture being commercially available under the trade name "Polyac."

The amount of vulcanizing agent can be varied widely, depending upon the particular agent utilized; using the preferred paradinitrosobenzene curing agent, in most cases from about 0.1 percent to about 1.5 percent by weight of the butyl rubber copolymer is employed.

In producing the adhesive composition, the polymer of a 4 carbon monoolefin and the copolymer as described above are thoroughly mixed on a suitable mill or mixer and then vulcanized after the addition of an amount of vulcanizing agent sufficient to obtain the desired properties. It is not necessary to provide sufficient vulcanizing agent for complete vulcanization, but generally, the ratio of vulcanizing agent to butyl rubber required for optimum properties is greater with higher proportions of the polymer of the monoolefin compared to the butyl rubber copolymer.

While it is possible to cure small amounts of the mixture under static conditions, with larger amounts it is preferable that the vulcanization be completed in the mill or mixer. By adding the vulcanizing agent during the milling or mixing, a separate curing operation is avoided and the vulcanizing agent can be thoroughly dispersed before vulcanization begins. For this reason also, it is desirable that the mixture be cooled, if necessary to a temperature below about 225° F. before the vulcanizing agent is added.

Other optional ingredients may also be added to the adhesive composition. For example, small amounts, e.g., about 1 percent to about 15 percent by weight, of zinc oxide can be added to aid in the mixing of the mixture and to increase the resistance of the adhesive composition to deterioration upon exposure to ultraviolet light. Excessive amounts of zinc oxide should be avoided, however, because of possible adverse effects upon the adhesiveness and moisture resistance of the composition.

Similarly, it is often desirable to incorporate small amounts of carbon black in the composition in order to attain a more pleasing and uniform appearance, and to reinforce and stabilize the material. Up to about 70 percent by weight of carbon black may be employed, based on the total weight of the polymer and copolymer. Carbon black may also be used to aid in resistance to aging caused by ultraviolet light, and for this purpose, as little as 1 percent by weight can be effective.

Still other additives can be utilized in the adhesive composition within the scope of the invention, such as, for example, fillers and similar modifiers which may be used to slightly alter the flow properties of the adhesive composition. Other additives may include various softeners and tackifiers which may be used to supplement the 4 carbon atom monoolefin polymer. These can be, for example, resins such as that known as Amberol ST-137X, which is a thermoplastic para-substituted phenol-formaldehyde resin, or oils such as the naphthenic white petroleum oil known as Primol D and the paraffinic oil known as Faxam 40. Other such softeners and tackifiers include diisooctyl phthalate; rosin derivatives, such as hydrogenated rosin esters; polyterpene resins, such as the hydrocarbon thermoplastic terpene resin composed chiefly of polymers of pinene, known as Piccolyte; and low molecular weight amorphous polyolefins, such as the polypropylene resin known as Oletac–100.

The sealing elements herein contain an integral core within the adhesive composition. This core can be made of any resilient, flexible polymeric material. Included are such materials as polyamides, vinyl halide polymers and copolymers, vinylidene halide polymers, polyethylene, polypropylene, polyesters, polyurethane, polystyrene, and similar polymeric substances which can be formed into elongated bodies suitable for incorporation within the sealing elements as described.

While the core material can be spongy, elastomeric or non-elastomeric, it is preferred to use vulcanized diene polymers and similar rubbery polymers, such as polymers of butadiene, isoprene, chloroprene; butadiene-styrene copolymers; butadiene-acrylonitrile copolymers; isoprene-isobutylene copolymers; silicone rubbers; and the like. Especially preferred are rubbery polymeric materials having a Shore A Durometer hardness of from about 20 to about 100, and preferably 30 to 55, based on the Shore Durometer test (ASTM D676–59T). Neoprene is a specific preferred core material.

If desired, when an extensible material is employed as the core, there may be incorporated therein a continuous thread or strand of fiberglass or a similar material having lower extensibility than the core material. This serves to minimize deformation of the sealing element during handling or use.

The shape of the core is not critical, but in most cases will be governed by the desired application to which the sealing element is to be put. Hollow or tubular cores may be employed, as may round, square or rectangular shaped cores. Where the sealing element is to be utilized for glazing a windshield or similar structure wherein curves and corners are involved, it is greatly preferred to employ a round core because this reduces the possibility of errors in application. Also, the sealing elements are more easily extruded employing round core materials.

While it is necessary to the invention to have a core present in the sealing element, the minimum size of the core can be very low, depending upon factors such as the desired spacing of the surfaces, the extent of overlap, tolerances, and the configuration of the structure to be sealed. Similarly, the proportion of the core material within the sealing element can be very large provided there is sufficient adhesive composition to provide compressibility of the adhesive around the core. For this purpose, 0.01 inch of adhesive around the core is sufficient in most instances. Obviously, the total size of the sealing element can be varied to suit any particular application and is not critical to the nature of the invention, and will also depend upon factors such as those mentioned above.

Set forth below are several examples illustrating the nature of the adhesive compositions employed in the sealing elements described herein. These are produced by conventional techniques. Generally, the components, except for the vulcanizing agent, are homogeneously mixed on a two-roll rubber compounding mill at a temperature between about 150° F. and 200° F. The vulcanizing agent is then added and mixed thoroughly, and the mixture allowed to heat sufficiently to permit the vulcanization reaction to take place. Milling is then continued for a time sufficient for the desired vulcanization to take place.

EXAMPLE 1

| | Parts by weight |
|---|---|
| Butyl rubber (Enjay Butyl 150, molecular weight 40,000) | 100 |
| *Polybutenes (average molecular weight about 2100) | 50 |
| Zinc oxide | 5.0 |
| Carbon black | 7.5 |
| Paradinitrosobenzene (Polyac) | 1.0 |

*Mixture of 42 percent Oronite 32 (molecular weight 1200) and 58 percent Oronite 128 (molecular weight 2700), which are polymerized petroleum fractions containing over 90 percent of isobutylene, butene-1 and butene-2.

EXAMPLE 2

| | Parts by weight |
|---|---|
| Butyl rubber (Enjay Butyl 217) | 100 |
| Polybutene (as in Example 1) | 50 |
| Zinc oxide | 5.0 |
| Carbon black | 7.5 |

Example 2—Continued

| | Parts by weight |
|---|---|
| Paradinitrosobenzene (Polyac) | 1.0 |
| Sulfur | 0.5 |
| 2-mercaptobenzothiazole | 0.3 |

EXAMPLE 3

| | Parts by weight |
|---|---|
| Butyl rubber (Enjay Butyl 150) | 100 |
| Polyisobutylene (molecular weight 10,000; Vistanex LM–MS) | 100 |
| Zinc oxide | 10.0 |
| Carbon black | 15.0 |
| Paradinitrosobenzene (Polyac) | 1.0 |

EXAMPLE 4

| | Parts by weight |
|---|---|
| Butyl rubber (Enjay Butyl 150) | 100 |
| Polyisobutylene (molecular weight 12,000; Oppanol B–12) | 200 |
| Zinc oxide | 25 |
| Carbon black | 60 |
| Paraquinone dioxime | 6 |
| Lead oxide ($Pb_3O_4$) | 10 |

EXAMPLE 5

| | Parts by weight |
|---|---|
| Butyl rubber (Enjay Butyl 150) | 100 |
| Polyisobutylene (molecular weight 12,000; Oppanol B–12) | 200 |
| Zinc oxide | 10 |
| Carbon black | 60 |
| Sulfur | 2 |
| Butyl zimate | 4 |

EXAMPLE 6

| | Parts by weight |
|---|---|
| Butyl rubber (Enjay Butyl 150) | 100 |
| *Polybutene (average molecular weight about 3800) | 52 |
| Carbon black | 55 |
| Zinc oxide | 5 |
| Paradinitrosobenzene (Polyac) | 0.6 |

*Mixture of 33 percent Oronite 128, 44 percent Oronite 32, and 23 percent Vistanex LM-MS.

EXAMPLE 7

| | Parts by weight |
|---|---|
| Chlorinated butyl rubber (Enjay Butyl HT–1066) | 100 |
| Polybutene (Oronite 128) | 60 |
| Carbon black | 20 |
| Zinc oxide | 3 |
| Paradinitrosobenzene (Polyac) | 2 |

EXAMPLE 8

| | Parts by weight |
|---|---|
| Chlorinated butyl rubber (Enjay Butyl HT–1066) | 100 |
| Polyisobutylene (molecular weight about 10,000) | 160 |
| Carbon black | 25 |
| Zinc oxide | 3 |
| *Phenolic resin | 4 |

*Heat-reactive methylol-containing alkyl substituted phenol-formaldehyde resin known as Schenectady SP–1045.

EXAMPLE 9

| | Parts by weight |
|---|---|
| Chlorinated butyl rubber (Enjay Butyl HT–1066) | 100 |
| Mixed polybutenes (average molecular weight 2000) | 50 |
| Carbon black | 60 |
| Zinc oxide | 5 |

In producing the sealing elements of the invention, the resilient core material is incorporated into compositions as exemplified above to produce a preformed, elongated strip comprising the sealant around the core. While the manufacture of the sealing element can be carried out by hand forming or other manual operation, any significant quantities of the sealing element are best obtained by extrusion or a similar process whereby a uniform, more or less continuous product of desired dimension can be obtained.

A particularly desirable embodiment of the invention comprises the adhesive composition of Example 1 above and a core made of neoprene having a Shore A Durometer hardness of 40 to 50. The sealing element is rectangular in cross-section, with dimensions of ⅜ inch by ½ inch. The core is round in cross-section and is of ⅛ inch diameter. The sealing element, as described, has been employed to seal various solid surfaces to each other with highly advantageous results. Sealing is achieved by placing the sealing element between the surfaces and applying sufficient pressure to at least partially compress the sealing element.

For example, a glass windshield was attached to an automobile body by placing a continuous length of the above-described sealing element around the periphery of the pinch-weld flange, and then pressing the windshield against the sealing element. Pressure of 10 pounds per square inch was applied for 3 minutes. The vertical dead weight of the glass was supported by two rubber setting blocks, but no channel members, gaskets, or the like were employed, nor was the windshield sealed by any other means. The windshield was firmly and securely attached to the metal flange, and the seal between the glass and the metal was moisture and vapor impervious. Its structural properties and weather tightness were maintained under severe climatic and field loading conditions.

Comparable results are attained by substituting the adhesive compositions of Examples 2 to 9 above for the composition of Example 1 in the sealing element described above. Similarly, there can be utilized in the same manner other adhesive compositions within the scope of the invention as disclosed herein. Also, other core materials, including various rubbers, polymers and other resilient, flexible polymeric materials, can be substituted for the neoprene in the above-described sealing element. As indicated above, a continuous thread of fiberglass or other relatively non-extensible material can be incorporated in the neoprene or other core material if desired.

According to the provisions of the patent statutes, there are described above the invention and what are now considered to be its best embodiments. However, within the scope of the appended claims, it is to be understood that the invention can be practiced otherwise than as specifically described.

What is claimed is:
1. An elongated sealing element which comprises:
   (1) a tacky, moisture and vapor impervious adhesive composition comprising an at least partially vulcanized mixture of (a) a polymer of a monoolefin containing 4 carbon atoms and having a molecular weight between 300 and 15,000, and (b) a copolymer of from about 70 to about 99.5 parts by weight of a monoolefin containing 4 carbon atoms, and from about 0.5 to about 30 parts by weight of a diolefin containing 4 to 6 carbon atoms, said copolymer having a molecular weight between 25,000 and about 100,000, said polymer being present in an amount equal to about 45 to about 210 parts by weight per 100 parts of said copolymer; and
   (2) an integral core within said adhesive composition composed of a resilient, flexible polymeric material having a Shore A Durometer hardness of from about 20 to about 100;
   the surface of said sealing element being a layer of said adhesive composition at least 0.01 inch in thickness.
2. The sealing element of claim 1 in which said polymer is polyisobutylene having a molecular weight of between about 8,000 and about 15,000, said copolymer has a molecular weight between about 30,000 and about 60,000, and there are present from about 100 to about

210 parts by weight of said polyisobutylene per 100 parts of said copolymer.

3. The sealing element of claim 1 in which said polymer is a polymerized petroleum fraction comprising mixed butenes having a molecular weight between about 300 and about 5,000, said copolymer has a molecular weight between about 30,000 and about 60,000, and there are present from about 45 to about 65 parts by weight of said polymer per 100 parts of said copolymer.

4. The sealing element of claim 1 in which said integral core contains a continuous thread of a material having lower extensibility than said core.

5. A glazed structure comprising a glass sheet member, a solid surface, and a sealing element between said glass and said surface, and forming an adherent, moisture and vapor impervious seal therebetween, said sealing element being comprised of:

(1) a tackky, moisture and vapor impervious, pressure-sensitive adhesive composition comprising an at least partially vulcanized mixture of (a) polyisobutylene having a molecular weight between about 300 and about 150,000, and (b) a copolymer of from about 70 to about 99.5 parts by weight of isobutylene and from about 0.5 to about 30 parts by weight of isoprene having a molecular weight between about 25,000 and about 100,000, said polyisobutylene being present in an amount equal to about 45 to about 210 parts by weight per 100 parts of said copolymer; and (2) an integral core within said adhesive composition composed of resilient, flexible polymeric material having a Shore A Durometer hardness of from about 20 to about 100;

the surface of said sealing element being a layer of said adhesive composition at least 0.01 inch in thickness.

6. The sealing element of claim 1 in which said resilient, flexible polymeric material is neoprene.

7. The sealing element of claim 1 in which said adhesive composition contains from about 1 percent to about 15 percent by weight of zinc oxide and from about 1 percent to about 70 percent by weight of carbon black, said percentages being based on the total of said polymer and copolymer.

References Cited by the Examiner

UNITED STATES PATENTS

| | | | |
|---|---|---|---|
| 1,915,098 | 6/1933 | Kile | 52—203 |
| 2,098,127 | 11/1937 | Auger | 52—203 |
| 2,111,343 | 3/1938 | Walz | 52—203 |
| 2,249,547 | 7/1941 | Balfe. | |
| 2,454,821 | 11/1948 | McKee | 20—56.4 |
| 2,497,261 | 2/1950 | Hicks | 20—56.4 |
| 2,781,561 | 2/1957 | Gifford et al. | 20—56.4 X |
| 2,791,004 | 5/1957 | Sullivan. | |
| 2,974,377 | 3/1961 | Kunkle | 52—616 |
| 3,076,777 | 2/1963 | Zeolla et al. | 260—888 X |
| 3,155,204 | 11/1964 | Campbell et al. | |

HARRISON R. MOSELEY, *Primary Examiner.*

REINALDO P. MACHADO, *Examiner.*

W. E. HEATON, A. I. BREIER, *Assistant Examiners.*

UNITED STATES PATENT OFFICE
CERTIFICATE OF CORRECTION

Patent No. 3,288,667                          November 29, 1966

Thomas P. Martin

It is hereby certified that error appears in the above numbered patent requiring correction and that the said Letters Patent should read as corrected below.

Column 7, line 18, for "tackky" read -- tacky --; line 22, for "150,000" read -- 15,000 --.

Signed and sealed this 6th day of August 1968.

(SEAL)
Attest:

Edward M. Fletcher, Jr.

Attesting Officer

EDWARD J. BRENNER

Commissioner of Patents